United States Patent [19]  [11] 4,149,579
Senger  [45] Apr. 17, 1979

[54] PNEUMATIC VEHICLE TIRE WITH A DEVICE FOR REMEDYING A TIRE FAILURE

[75] Inventor: Gerhard F. J. Senger, Aachen, Fed. Rep. of Germany

[73] Assignee: Uniroyal Aktiengesellschaft, Aachen, Fed. Rep. of Germany

[21] Appl. No.: 748,262

[22] Filed: Dec. 6, 1976

[30] Foreign Application Priority Data

Dec. 17, 1975 [DE] Fed. Rep. of Germany ....... 2556870

[51] Int. Cl.² .............................................. B60C 17/00
[52] U.S. Cl. .................................... 152/347; 152/310; 152/418
[58] Field of Search ............... 152/346, 347, 348, 310, 152/311, 312, 418; 156/115; 106/33

[56] References Cited

U.S. PATENT DOCUMENTS

| | | | |
|---|---|---|---|
| 3,022,810 | 2/1962 | Lambe | 152/310 |
| 3,511,294 | 5/1970 | Bepristis et al. | 152/418 |
| 3,903,946 | 9/1975 | French et al. | 152/330 L |
| 3,931,843 | 1/1976 | Edwards et al. | 152/330 L |

FOREIGN PATENT DOCUMENTS 1359461 7/1974 United Kingdom ................ 152/330 L Primary Examiner—Francis S. Husar
Assistant Examiner—D. W. Underwood
Attorney, Agent, or Firm—Philip Rodman

[57] ABSTRACT

A pneumatic tire, after manufacture, is provided with a propellant material and a foam forming sealant material in its interior pressurizable space. The propellant and sealant are isolated from each other during normal running conditions of the tire and have no significant effect on the normal running characteristics of the tire. When a tire fails due to a puncture or the like, a loss of tire pressure and/or collapse of the tire structure and/or heat build up in the bead area due to friction permit the propellant and the foam forming materials to interreact.

In one embodiment of the invention the propellant and sealant are enclosed in separate chambers of a plurality of dual-chamber containers secured to the bead portion of the tire and/or a rim base. In other embodiments a plurality of mono-chamber containers house one of the materials, the other material being uncontained in the pressurizable space.

24 Claims, 6 Drawing Figures

PNEUMATIC VEHICLE TIRE WITH A DEVICE FOR REMEDYING A TIRE FAILURE

This invention relates to pneumatic vehicle tires and more particularly to a pneumatic vehicle tire having means for remedying a tire failure due to a puncture or the like, to permit operation of the tire immediately after failure.

Past efforts to make a puncture-proof or self-sealing pneumatic vehicle tire have been well documented. One known approach comprises coating the inside rubber of a pneumatic tire with a layer of special sealing compound that is cured with the tire material and functions as a patch for tire leaks (see German Pat. No. 1,032,682).

Another known approach toward a puncture-proof pneumatic tire involves substantially filling the tire with foam (see German published patent application disclosures Nos. 1,936,526, 1,505,029 or 1,605,664). Although tires manufactured with foam completely filling the interior are generally not subject to blowouts and therefore, are especially suitable for emergency-use vehicles and/or vehicles requiring bulletproof tires, such tires are usually uncomfortable to travel upon. Moreover the pressure level in the foam filling tends to decrease in time as a result of diffusion, and elevated pressures are difficult to reestablish in the individual foam cells.

Foamable compounds for use with tires have also been provided in pressurized spray containers. When a tire failure occurs a propellant in the container is used to force the foamable component through the tire valve to the tire interior where it expands to form a puncture-sealing foam (see U.S. Pat. No. 3,843,586).

Pressurized spray containers with puncture-sealing compounds have been mounted on the outside of a tire, such as upon the tire rim. The container is rendered communicable with the tire valve to sense a pressure drop that triggers expulsion of the container contents through the tire valve for dispersion to the site of the hole or leak (see German Utility Pat. No. 1,925,109).

Alternatively a pressurized container can be secured to the rim base inside the tire and surrounded by an expandable tube that communicates with the container. A pressure drop inside the tire due to a tire failure causes the container contents to be expelled into the expandable tube (see U.S. Pat. No. 3,511,294).

The arrangements required for mounting pressurized spray containers on the outside of a tire rim or inside the tire at the rim are extremely costly, represent a substantial increase in tire weight and create severe out-of-round conditions in the tire with resultant problems of imbalance.

Generally, when a tire failure occurs a considerable amount of heat is generated in the tread and on the inside of the tire beads as a result of friction. One known way of reducing this frictional heat and achieving an improved sliding that enables the tire to be used for emergency travel is to provide a lubricant in capsules or in pocket-like cavities in the tire bead zone or along the underside of the tread. When a failure occurs the lubricant is expelled and forms a separator film between the tire and the surfaces that brace it (see German published patent application disclosures Nos. 2,130,259, 2,130,264, and 2,130,329).

Lubricant can also be incorporated in foam that is expanded in the tire interior (see German published patent application disclosures Nos. 2,354,929 and 2,460,253). However, lubricants are usually incompatible with sealants and normally do not permit long distance emergency use of a tire after it has failed.

U.S. Pat. No. 3,444,918 discloses capsules having a sealing compound in the tire interior that form a circumferential lining in the area of the tread. When the tire tread is punctured a capsule is likewise punctured to release the sealing compound which flows to the puncture. However the provision of capsules under the tread area has a detrimental effect on the travel properties of the tire such as marked imbalances. There is also a substantial risk that the capsules will burst prematurely and dissipate prior to a tire failure due to the continuous deflections and compressions of the tread during normal tire operation.

It is thus desirable to provide a pneumatic tire with means for remedying a tire failure, which means are activated during tire failure yet remain dormant without having any significant effect on tire operation during normal running conditions.

Among the several objects of the present invention may be noted the provision of an improved automatic sealing system for a pneumatic vehicle tire that does not significantly affect the weight or normal running characteristics of the tire, and a simple, inexpensive and dependable, tire sealing system that is automatically activated during a tire failure to seal a puncture or leak in the tire and thereby render the tire with adequate long distance emergency travel properties. Other objects and features will be in part apparent and in part pointed out hereinafter.

In accordance with the present invention a conventionally manufactured tire is provided with capsules or pocket-shaped miniature containers in one or both areas adjoining the tire beads. Each miniature container includes an inner wall partition that divides the container into two chambers for respectively accommodating a sealing agent and a propellant.

The miniature containers will burst when the interior tire pressure is reduced as a result of tire failure, such as a failure attributable to puncture of the tread. The containers will also burst if directly punctured by the object causing the tire failure, or burst as a result of frictional contact with the interior tire surface that collapses against the containers when there is loss of tire pressure. Elevated heat due to friction in the bead area that occurs after a loss of tire pressure can likewise cause the containers to burst.

When a wall of any one chamber bursts the other chamber ruptures as well thereby permitting the propellant to operate on the sealing agent in a foam forming reaction under pressure and temperature conditions that are normally present in the tire at the moment a tire failure occurs.

Since the miniature dual-chamber containers are located in the bead area of the tire they are unlikely to burst prematurely because the bead does not appreciably compress or deflect when the tire is running under normal load conditions. Therefore the bead does not unduly stress the containers. The location of the containers in the bead area also ensures against the containers having any significant detrimental effect on the running properties or travel comfort of the tire. Such location also ensures that container rupture by mechanical means occurs after an extensive drop of pressure in the tire.

The invention accordingly comprises the constructions hereinafter described, the scope of the invention being indicated in the following claims.

In the accompanying drawings in which various embodiments of the invention are illustrated:

Figure 1:
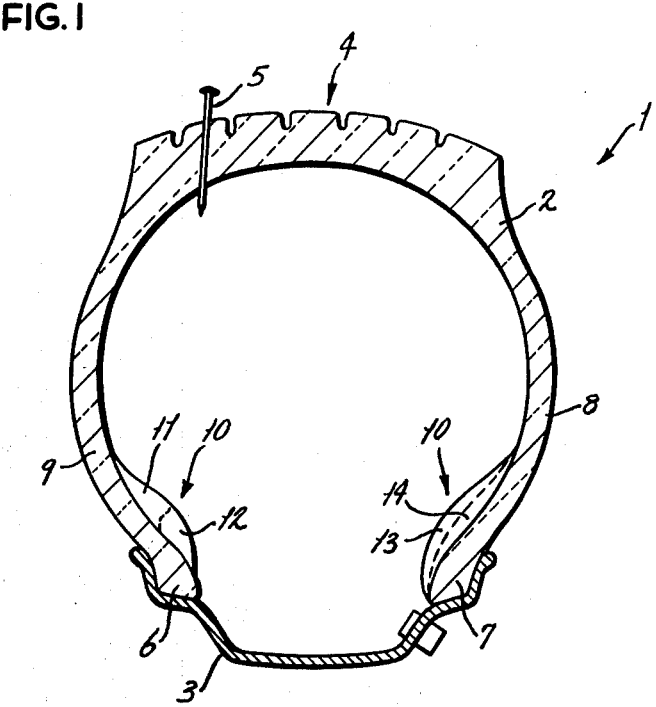
FIG. 1 is a fragmentary cross-sectional view of a pneumatic vehicle tire incorporating one embodiment of the present invention.

Referring now to the drawings a wheel assembly is generally indicated by the reference number 1. The wheel assembly 1 comprises a pneumatic vehicle tire 2 of the tubeless type mounted upon a wheel rim 3. The tire 2 includes a tread portion 4, two bead portions 6 and 7, and sidewall portions 8 and 9.

A capsule or pocket-shaped container 10, formed of rubber, plastic or other suitable known material, is disposed along the interior of the beads 6, 7 and extends beyond the beads partly into the radially inward sidewall area. Although the container 10 can be sized to extend around the bead circumference, preferably a plurality of miniature spaced containers 10 are arranged along the interior bead circumference of the tire 2. The miniature containers 10 should be uniformly distributed around the bead circumference to ensure that the tire 2 has substantially uniform travel properties during emergency conditions.

The miniature containers 10 are adhered to the tire 2 after its manufacture by a suitable cement or adhesive. However the containers 10 can also be vulcanized to the tire 2 if desired.

The containers 10 are preferably formed of a rubber or plastic material that can be readily perforated by being punctured, that can rupture by frictional contact with an interior surface of the tire 2 due to squeezing and compressing of the tire or that can burst under predetermined heat conditions due to tirefriction after the tire fails. The container material can also be capable of bursting when pressure losses reach a predetermined level in the tire after a tire failure. However mechanical rupture, puncture, or heat bursting of the containers 10 is preferred since a rupture that is dependent on a reduced pressure requires a container structure built of highly sensitive materials.

Figure 2:
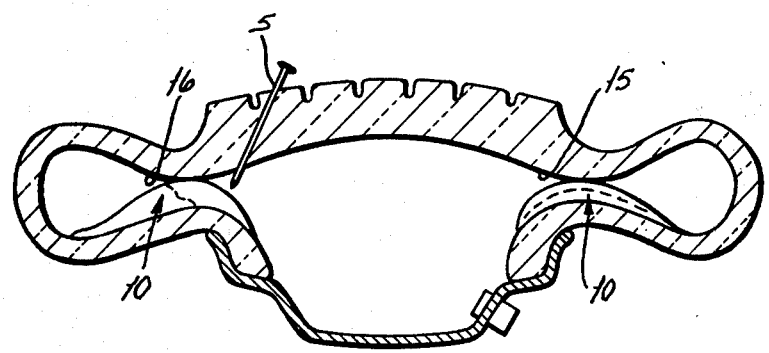
FIG. 2 is a view thereof following a tire failure.

Each miniature container 10 has an inner partition, shown dotted in FIGS. 1 and 2, that subdivides the container into two chambers. The partition can be oriented substantially perpendicular to the inner surface of the tire 2 to define two chambers 11 and 12 positioned in a radially sequential configuration as shown on the left side of FIG. 1 or the partition can be oriented substantially parallel to the inner surface of the tire 2 to define two chambers 13 and 14 in a radially superpositioned configuration as shown on the right side of FIG. 1.

One of the dual chambers 11 and 12 or 13 and 14 of the miniature containers 10 houses a liquid rubber or plastic solution while the other chamber houses a propellant. Any suitable known liquid rubber or plastic solution can serve as the foamable component. These solutions can be selected, for instance, from the groups of elastomers, thermoplasts or duromers such as silicone rubber, ethylenepropylene copolymers, polyisoprene, polystyrene, polybutadiene, polyvinyl chloride and copolymers thereof, polyethylene and copolymers thereof, polypropylene and copolymers thereof, cellulose acetate, polyamide, polyimide, linear polyurethane, polyurethane, ionomers, polybenzimidazol, phenol, formaldehyde, urea formaldehyde, unsaturated polyester resins, and epoxy resins.

The propellant, which can be present in a gaseous, liquid, or solid state, is of any suitable known make-up such as nitrogen, carbon dioxide, air, carbon halide, for instance trichlorofluoromethane. The propellant can also be selected from the groups of aliphatic hydrocarbons or alkane halides having a low boiling point. Use can also be made of azo compounds, N-nitrose compounds as well as sulfohydrazine, azoisobutyric acid dinitrile, benzol sulfohydrazide, N'N-dinitrose-N, N'-dimethyltherephthalamide, azohexahydrobenzonitrile, substituted thiatriazol, benzol-1, 3-disulfohydrazide, diphenolsulfono-3, 3'-disulfohydrazide, diphenoloxide-4, 4'-disulfohydrazide, dinitrosopentamethylene-tetramine, and azodicarbonamide (azodiformamide).

The materials stored inside the chambers 11 and 12 or 13 and 14 of the miniature containers 10 can be selected in quantities large enough to enable the tire 2 to reassume substantially its original configuration as shown in FIG. 1. Preferably this is brought about by the quantity of propellant used, although the restoration of tire configuration ca also occur as a result of foam filling the interior of the tire 2.

If failure of the tire 2 is, for example, due to a tread puncture caused by a nail 5 the tire 2 loses pressure during subsequent travel and, when loaded, eventually assumes the cross-sectional shape shown in FIG. 2. The nail 5 will then strike the container 10 shown on the left side of FIG. 2, or the interior surfaces of the tire 2 will partially collapse against itself at the beads and radially inward sidewall areas to subject these areas to substantial compressive and frictional forces.

The resulting pressures due to squeezing and compressing of the tire body, as well as the resulting building up of heat in the tire 2 causes the containers 10 to rupture whereby the components of the chambers 11 and 12 or 13 and 14 emerge and react with one another to form a foam sealant that is conducted by the propellant to the site of the tire leak or failure.

Once an exposed wall of the container 10 bursts the pressure drop in the affected chambers causes the inner wall separating the two chambers to burst as well. The foaming reaction takes place in a matter of seconds following rupture of the containers 10. The leak site in the tire is plugged or blocked by the foam under pressure of the propellant which simultaneously effects partial inflation of the tire body.

Figure 5:
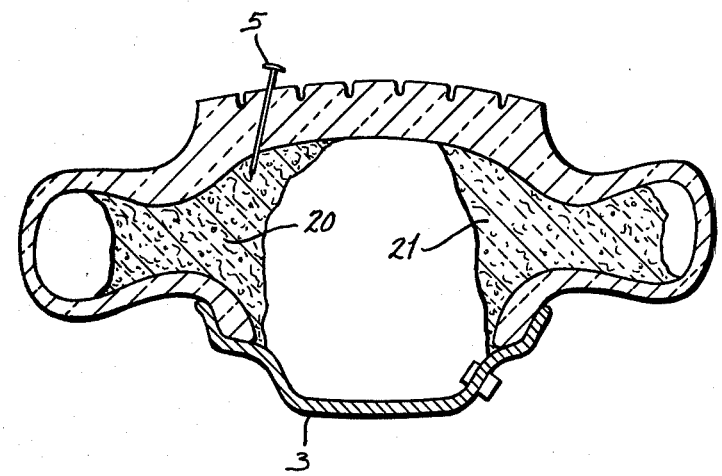
FIG. 5 shows a tire after a failure has been remedied.

As will be seen from FIG. 5, the foam areas 20 and 21 block off any leak in the tire 2 and the pressure of the propellant gas maintains the tire in its partially inflated state. Semi-elastic properties of the foam permit the tire 2 to endure its loaded condition and the previously collapsed contacting portions of the tire are separated as a result of the foam filling, thereby enabling the tire to be solidly seated on the rim base in its partially inflated state.

The foams, which are heat resistant to at least 100° C., have a closed port texture, and are substantially semi-elastic at a counter pressure of 3kg/sq.cm. The foam can thus withstand elevated heat conditions caused by increased squeezing and compressing of the tire in its partially inflated state and maintain its carrying capacity and sealing functions. In this manner the tire 2, even under loaded conditions, is enabled to be used for many additional miles of travel to a repair shop or the like.

Figure 3:
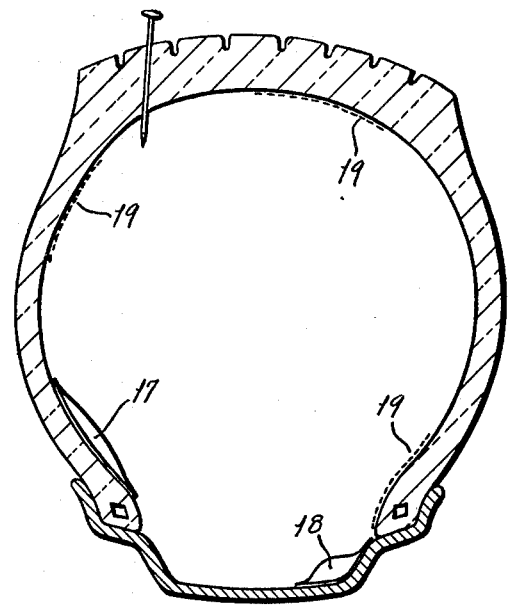
FIGS. 3 and 4 show other embodiments of my invention.

In another embodiment of my invention, as shown in FIG. 3, a plurality of miniature single-chamber containers 17 and 18, housing a propellant, are disposed along the interior of the beads, similarly to the arrangement of the containers 10 in FIG. 1. The containers 17 and 18 can also be disposed along the wheel rim adjacent the beads, or at the rim base. The inner surface of the tire is partially or completely sprayed, painted or otherwise coated with a rubber or plastic solution as suggested by the reference number 19. When a tire failure occurs the containers 17 and 18 rupture in a manner previously described to enable the propellant to interreact with the coating 19, also as previously described for the embodiment of FIGS. 1 and 2.

Figure 4:
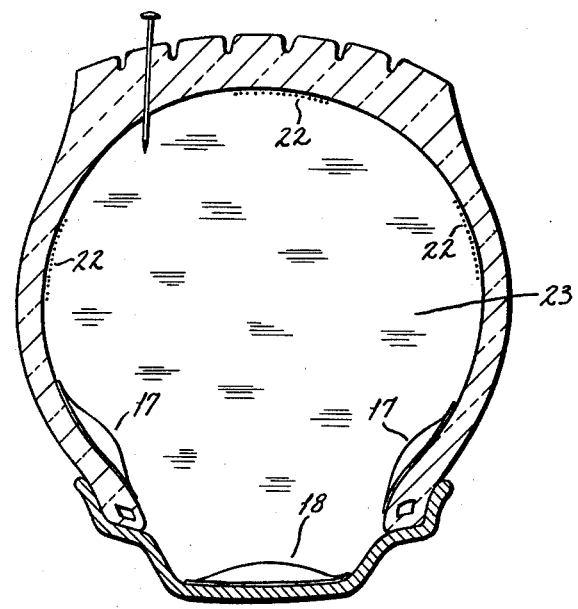

In another embodiment of my invention, as shown in FIG. 4 a plurality of miniature single-chamber containers 17 and 18, housing a rubber or plastic solution, are arranged in a fashion similar to that described for the containers 17 and 18 of FIG. 3 with a propellant 22 filling the inner space 23 of the tire 2 in a gaseous state. Alternatively the propellant can be applied to the inner surface of the finished tire in solid or liquid form as suggested by the reference number 22. Normally the gaseous propellant is introduced into the tire after it has been completely mounted on the rim. When a tire failure occurs the containers 17 and 18 rupture in a manner previously described to enable the rubber solution to interreact with the propellant, also as previously described for the embodiments of FIGS. 1 and 2.

Figure 6:
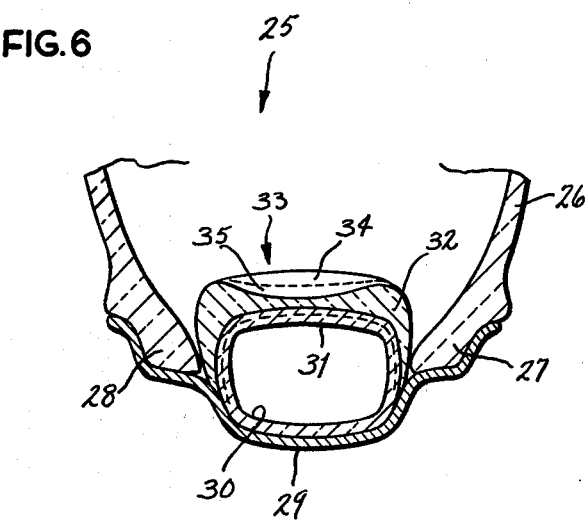
FIG. 6 shows another embodiment of my invention.

In another embodiment of my invention, shown in FIG. 6, a wheel assembly 25 includes a tire 26 with bead portions 27 and 28 mounted upon a rim 29. An annular support element 30 made of an elastomer reinforced with cord material, is disposed in the base of a rim 29 between the bead portions 27 and 28. The annular support element 30 is reinforced in its exposed crown area by, for example, two steel cord plies 31, and provided with a cover layer 32 of silicone rubber, for example, to permit satisfactory sliding of a collapsed tire surface during emergency travel. A plurality of pocket-like miniature containers 33, subdivided by a partition into two chambers 34 and 35, are disposed in the crown area of the cover layer 32 and are preferably secured therein before the element 30 is disposed around the rim 29.

Under this arrangement the annular support element 30 maintains the beads 27 and 28 of the pneumatic vehicle tire 26 firmly on the rim 29 even when there is a drop of interior tire pressure. Moreover the containers 33 are substantially isolated from tire stresses due to tire load during normal operation of the tire even though the annular support element 30 contacts the beads 27 and 28 of the tire 26. Therefore a premature breaking open of the miniature containers 33 is a minimal risk and the miniature containers can be manufactured of a material having low strength and ready capability of bursting open.

When a tire failure causes tire pressure to drop, the inner surface of the tire crown is collapsed against the outer surface of the annular support element 30. The containers 33 rupture from the heat generated by rubbing surfaces and/or by mechanical squeezing and compressing of the tire 26 against the support body 30. The substances in the chambers 34 and 35 emerge and react with one another in a manner similar to that described for the embodiments of FIGS. 1 and 2.

Some advantages of the present invention evident from the foregoing description include a tire assembly having interior containers of leak-sealing materials at locations that experience relatively minor stresses and compressions during normal tire operation yet are exposed to extreme mechanical stresses and heat build-up upon the occurrence of the tire failure. Consequently the containers need not have very high strength, flexibility and/or elasticity to withstand the conditions of normal tire operation and there is a minimal likelihood of premature destruction of the containers 10 prior to a tire failure. A further advantage is that the leak sealing system can be introduced into the tire after tire manufacture is completed. A further advantage is a leak sealing system for a tire that does not significantly affect normal driving characteristics of the tire and permits long-distance emergency use of the tire after it has failed. Still another advantage is a two-component leak sealing system for a tire wherein one component is present in the tire interior in a container and the other component is uncontained in the tire interior such that a tire failure causes a reaction between the components by releasing the contained component to permit it to interreact with the uncontained component.

In view of the above it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. In combination, a pneumatic vehicle tire mountable on a rim comprising, in cross-section, a tread portion, opposite sidewall portions joining said tread portion and terminating in respective bead portions engageable with said rim to define a pressurizable interior space of said tire, the surfaces of said bead portions and said rim in said interior space representing a contact zone normally free from contact with other interior surface portions of said tire during normal running conditions of said tire, a propellant material for forming plastic foam and a foam forming sealant material disposed in said interior space, and a first closed chamber containing one of said materials during normal running conditions of said tire, said first closed chamber being installed in the interior space of said tire by securance at said contact zone after manufacture of said tire, said first closed chamber being formed of a material capable of rupturing when contacted by interior surfaces of said tire normally disposed beyond the contact zone yet collapsible into said contact zone under loaded tire conditions when a failure of said tire causes a loss of pressure from said interior space, the bursting of said first closed chamber permitting interreaction of said propellant material and said foam forming sealant materialial to form said plastic foam sealing compound movable toward the site of said tire failure under the influence of said propellant to block pressure leakage at said failure site and thereby remedy said tire failure.

2. The combination of claim 1 wherein said first closed chamber is of miniature size in relation to said interior space and is present in a first plural quantity secured at said contact zone in uniform distribution about the circumference of said contact zone.

3. The combination of claim 2 wherein said first plurality of closed chambers are secured to the bead portions of said tire.

4. The combination of claim 2 wherein said first plurality of closed chambers are secured to said rim.

5. The combination of claim 2 further including an annular elastomeric support element surrounding said rim intermediate said bead portions, said support element having an upper free surface and said first plurality of closed chambers being secured to the upper free surface of the support element.

6. The combination of claim 2 wherein said propellant material is enclosed in said first plurality of chambers.

7. The combination of claim 6 wherein unenclosed foam forming sealant material is in the interior space of said tire.

8. The combination of claim 6 wherein said foam forming sealant material coats the interior surface of said tire.

9. The combination of claim 2 wherein said foam forming sealant material is enclosed in said first plurality of chambers.

10. The combination of claim 9 wherein unenclosed propellant material is in the interior space of said tire.

11. The combination of claim 10 wherein the unenclosed propellant material is installed in said interior space as a gas.

12. The combination of claim 10 wherein the unenclosed propellant material is installed in said interior space as a liquid.

13. The combination of claim 10 wherein the unenclosed propellant material is installed in said interior space as a solid.

14. In combination, a pneumatic vehicle tire mountable on a rim comprising, in cross-section, a tread portion, opposite sidewall portions joining said thread portion and terminating in respective bead portions engageable with said rim to define a pressurizable interior space of said tire, the surfaces of said bead portions and said rim in said interior space representing a contact zone normally free from contact with other interior surface portions of said tire during normal running conditions of said tire, a propellant material and a foam forming sealant material disposed in said interior space, and a first closed chamber containing one of said materials during normal running conditions of said tire, said first closed chamber being installed in the interior space of said tire by securance at said contact zone after manufacture of said tire, said first closed chamber being formed of a material capable of rupturing when contacted by interior surfaces of said tire normally disposed beyond the contact zone yet collapsible into said contact zone under loaded tire conditions when a failure of said tire causes a loss of pressure from said interior space, the bursting of said first closed chamber permitting interreaction of said propellant material and said foam forming sealant material to form a foam sealing compound movable toward the site of said tire failure under the influence of said propellant to block pressure leakage at said failure site and thereby remedy said tire failure, and wherein said first closed chamber is of miniature size in relation to said interior space and is present in a first plural quantity secured at said contact zone in uniform distribution about the circumference of said contact zone, and wherein a second plurality of closed chambers are respectively formed adjacent said first plurality of closed chambers to provide a plurality of dual-chamber containers with one respective chamber in each container housing the propellant material and the other respective chamber in each container housing the foam forming sealant material.

15. The combination of claim 14 wherein the adjacent chambers are divided by a common partition having a bursting strength less than the pressure in any chamber such that rupture of any one chamber in a respective container causes rupture of the other respective chamber.

16. The combination of claim 14 wherein said plurality of dual-chamber containers are secured to the bead portion of said tire.

17. The combination of claim 14 wherein said plurality of dual-chamber containers are secured to said rim.

18. The combination of claim 14 further including an annular elastomeric support element surrounding said rim intermediate said bead portion, said support element having an upper free surface and said plurality of dual chamber containers being secured to the upper free surface of said support element.

19. In combination, a pneumatic vehicle tire comprising, in cross-section, a tread portion, opposite sidewall portions joining said thread portion and terminating in respective bead portions to define a pressurizable interior space of said tire, a first plurality of dual-chamber containers secured to at least one of said bead portions in said interior space normally free from contact with other interior surface portions of said tire during normal running conditions of said tire, said containers being of miniature size in relation to said interior space and being secured in uniform distribution around the circumference of said bead portion after manufacture of said tire, a propellant material being enclosed in one of the chambers of each said container and a foam forming sealant material being enclosed in the other chamber of each said container to isolate said materials from each other during normal running conditions of said tire, said containers being formed of a material capable of rupturing when contacted by interior surfaces of said tire normally disposed beyond the bead portion yet collapsible onto said bead portion under loaded tire conditions when a failure of said tire causes a loss of pressure from said interior space, the rupturing of said containers permitting interreaction of said propellant material and said foam forming sealant material to form a foam sealing compound movable toward the site of said tire failure under the influence of said propellant to block pressure leakage at said failure site and thereby remedy said tire failure.

20. The combination of claim 19 wherein a second plurality of said dual-chamber containers are secured to the other bead portion of said tire.

21. The combinatin of claim 19 wherein the chambers of each container are divided by a common partition having a bursting strength less than the pressure in any chamber such that rupture of any one chamber in any of said respective containers causes rupture of the other said chamber in said respective containers.

22. The combination of claim 1 wherein a predetermined amount of said foam forming sealant material is disposed in said tire in sufficient quantity to maintain the interior collapsible surfaces of said tire separate from said contact zone after said tire failure occurs.

23. The combination of claim 22 wherein said foam forming sealant material is a semi-elastic material that enables said tire to be solidly seated on said rim base after said tire failure occurs, due to disposition of said foam between said interior collapsible surfaces and said contact zone.

24. The combination of claim 1 wherein said foam forming sealant material is selected from the group consisting of silicone rubber, ethylene-propylene copolymers, polyisoprene, polystyrene, polybutadiene, polyvinyl chloride and copolymers thereof, polyethylene and copolymers thereof, polypropylene and copolymers thereof, cellulose acetate, polyamide, polyimide, linear polyurethane, polyurethane ionomers, polybenzimidazol, phenol formaldehyde resins, urea formaldehyde resins unsaturated polyester resins and epoxy resins.

* * * * *